(12) United States Patent
Goodman (10) Patent No.: US 11,400,529 B1
(45) Date of Patent: Aug. 2, 2022

(54) SINGLE POINT RIFLING TOOL

(71) Applicant: Adam P. Goodman, Jackson, WI (US)

(72) Inventor: Adam P. Goodman, Jackson, WI (US)

( * ) Notice: Subject to any disclaimer, the term of this patent is extended or adjusted under 35 U.S.C. 154(b) by 0 days.

(21) Appl. No.: 16/460,446

(22) Filed: Jul. 2, 2019

(51) Int. Cl.
*B23D 5/00* (2006.01)
*B23D 5/02* (2006.01)
*F41A 21/18* (2006.01)

(52) U.S. Cl.
CPC ............... *B23D 5/02* (2013.01); *F41A 21/18* (2013.01)

(58) Field of Classification Search
CPC . Y10T 409/502952; Y10T 409/503116; Y10T 409/50082; B23D 5/00; B23D 5/02; B23D 1/08; B23D 1/12; B23D 1/16; B23D 1/26; F41A 21/18
See application file for complete search history.

(56) References Cited

U.S. PATENT DOCUMENTS

| | | | | |
|---|---|---|---|---|
| 315,130 A | * | 4/1885 | Davenport et al. ...... | B23D 5/02 409/306 |
| 389,389 A | * | 9/1888 | Josset ....................... | B23C 3/30 409/143 |
| 872,036 A | * | 11/1907 | Wattie ...................... | B23D 5/02 409/306 |
| 1,019,892 A | * | 3/1912 | Hanson .................... | B23D 5/02 409/306 |
| 1,025,152 A | * | 5/1912 | Mitts ........................ | B23D 3/02 409/307 |
| 1,239,659 A | | 9/1917 | Andrews | |
| 1,239,660 A | * | 9/1917 | Andrews et al. ........ | B23D 5/02 409/306 |
| 1,294,750 A | | 2/1919 | Andrews | |
| 1,324,141 A | * | 12/1919 | Andrews .................. | B23D 5/00 409/293 |
| 1,324,289 A | * | 12/1919 | Andrews .............. | B23D 43/005 409/293 |
| 1,368,051 A | * | 2/1921 | Pope ........................ | B23D 5/02 409/306 |
| 2,086,111 A | * | 7/1937 | Andrews .................. | B23D 5/02 409/306 |
| 2,207,805 A | * | 7/1940 | Hoagland ................ | B23D 5/02 409/222 |
| 2,318,155 A | * | 5/1943 | Groene .................... | B23D 5/02 409/306 |
| 2,330,584 A | * | 9/1943 | Hoagland ................ | B23D 5/02 409/306 |
| 2,346,581 A | * | 4/1944 | Hoagland ................ | B23D 5/02 409/306 |
| 2,757,580 A | | 8/1956 | Drummond | |

(Continued)

FOREIGN PATENT DOCUMENTS

DE 1281785 B * 10/1968 ............... B23D 5/02

Primary Examiner — Nicole N Ramos
(74) Attorney, Agent, or Firm — Boyle Fredrickson S.C.

(57) ABSTRACT

A single-point rifling tool including a rifling head with a lateral opening, a hook ramp stationarily secured at a first end of the lateral opening, and a cutting tool movably secured at a second end of the lateral opening. The cutting tool is movable along an angled surface of the hook ramp between a retracted position and a cutting position so as to perform a rifling operation in only a single direction through a gun barrel so as to perform a rifling operation in only a single direction through a gun barrel.

10 Claims, 6 Drawing Sheets

(56) References Cited

U.S. PATENT DOCUMENTS

| | | | | |
|---|---|---|---|---|
| 3,317,216 A | * | 5/1967 | Muthler | B23B 41/02 |
| | | | | 277/358 |
| 5,181,812 A | * | 1/1993 | Labinka | B23B 41/02 |
| | | | | 408/234 |
| 7,207,751 B2 | * | 4/2007 | Feddersen | B23B 41/02 |
| | | | | 408/115 R |
| 2007/0258783 A1 | | 11/2007 | Bartlein et al. | |
| 2010/0161106 A1 | | 6/2010 | Bartlein et al. | |

* cited by examiner

SINGLE POINT RIFLING TOOL

BACKGROUND OF THE INVENTION

1. Field of the Invention

The present invention relates to a single point rifling tool and, more specifically, to a single point rifling tool with a hook tool that is retractable and adjustable by moving along a stationary wedge.

2. Discussion of the Related Art

Barrel rifling is directed to machining one or more helical grooves into an internal surface of a gun barrel for the purpose of exerting torque on a projectile to cause it to spin during shooting. As a result, the projectile is stabilized and accuracy is improved. Rifling methods include single point cut rifling, button rifling, and broach rifling. Single point cut rifling has many advantages over the other types of rifling. For example, single point cut rifling tooling allows for the shape, number and depth of the helical grooves to be adjusted as necessary. In addition, single point cut rifling allows for closer tolerances to be held during rifling of the barrel. Single point cut rifling also exerts minimal stress on the barrel during the rifling process.

Traditionally, barrel rifling cutting tools for single point cut rifling include a hook tool that is attached to the end of a rod. The rod is rotated and pulled through a barrel. The hook tool removes a small amount of material with each pass. After cutting the shallow grooves, the hook tool is adjusted to subsequently cut deeper grooves. This process is repeated until the grooves reach the desired depth. Single point cut rifling is the most accurate method of rifling and produces low stress on the barrel during the cutting process. However, single point cut rifling takes a lot of time and is, therefore, quite costly.

Most single point rifling tools known on the market today adjust the hook tool to adjust the depth of the groove by adjusting the location of a wedge within the rifling tool after each push stroke. For instance, a bottom surface of the hook tool is placed against an angled surface of the wedge. At the end of each push stroke, the wedge is moved toward the hook tool in order to adjust the cutting depth of the hook tool. In turn, the hook tool is passed through the barrel at the same cutting depth for a pull stroke and a push stroke. At the end of the push stroke, the hook tool is adjusted and then sent through the barrel at the new depth for the pull stroke and subsequent push stroke. As a result, the hook tool is passed through the barrel at the same cutting depth in two directions. This can cause burring in the grooves as the hook tool makes contact with the grooves on the return push stroke. Further yet, the hook tool receives additional wear as it makes contact with the grooves on the return push stroke.

Therefore, there is a need in the art for a single point rifling tool that adjusts the cutting depth of a hook tool for each pull stroke through the barrel in a single direction, while also returning the hook tool to a retracted non-cutting depth for each push stroke through the barrel to avoid contact with the interior of the barrel.

SUMMARY OF THE INVENTION

According to one aspect of the invention, a single-point rifling tool includes a rifling head with a lateral opening, a hook ramp stationarily secured at a first end of the lateral opening, and a cutting tool movably secured at a second end of the lateral opening. The cutting tool is movable along an angled surface of the hook ramp between a retracted position and a cutting position.

In accordance with another aspect of the invention, the single-point rifling tool also includes a channel formed in a first end of the rifling head and extending into the lateral opening. The channel is configured to receive a fastener. The fastener stationarily secures the hook ramp.

In accordance with yet another aspect of the invention, the single-point rifling tool includes a pull tube having a first end and a second end. The first end of the pull tube is coupled to a second end of the rifling head, while the second end of the pull tube is coupled to a bushing. In addition, an adjustment rod may be disposed within the pull tube so as to freely rotate within the pull tube. The pull tube may also extend through the bushing so as to freely rotate within the bushing. In such an embodiment of the invention, a threaded portion of the cutting tool extends into a channel formed in a first end of the adjustment rod. The threaded portion of the cutting tool is threadably engaged with the channel of the adjustment rod so that rotation of the adjustment rod causes movement of the cutting tool between the retracting position and the cutting position. Meanwhile, a second end of the adjustment rod is coupled to a rotation device that causes rotation of the adjustment rod. The second end of the rifling head may include an indentation formed therein and configured to receive the first end of the pull tube.

According to another aspect of the invention, a method of manufacturing a single-point rifling tool includes statically disposing a wedge within an opening of a rifling head of the tool and kinetically disposing a cutting tool within the opening of the rifling head of the tool adjacent an angled surface of the wedge. The cutting tool is movable along the angled surface of the wedge between a cutting position and a non-cutting position.

In accordance with another aspect of the invention, the method may also include forming a channel in a first end of the rifling head to the lateral opening and disposing a fastener within the channel configured to statically secure the hook ramp within the opening of the rifling head.

In accordance with yet another aspect of the invention, the method may also include coupling a first end of the pull tube to a second end of the rifling head and coupling a second end of the pull tube to a bushing. Further yet, an adjustment rod may be disposed within the pull tube. A threaded portion of the cutting tool extends into and is threadably engaged with a channel formed in a first end of the adjustment rod. In turn, rotation of the adjustment rod causes movement of the cutting tool between the retracting position and the cutting position. The method may also include coupling a second end of the adjustment rod to a rotation device configured to cause rotation of the adjustment rod.

In accordance with another aspect of the invention, the adjustment rod is configured to freely rotate within the pull tube. The adjustment rod may also extend through and be configured to freely rotate within the bushing. The method may also include coupling the first end of the pull tube with an indentation formed in the second end of the rifling head. In turn, the first end of the pull tube overlaps the indentation.

According to yet another aspect of the invention, a method of using a rifling tool to manufacture a rifled gun barrel includes providing the rifling tool, which includes a rifling head with an opening therein, a wedge statically secured within the opening at a first end thereof, a cutting tool movably secured within the opening at a second end thereof, a pull tube having a first end coupled to the rifling head and a second end coupled to a bushing, and an adjustment rod disposed within the pull tube. The cutting tool is threadably engaged with a first end of the adjustment rod so that rotation of the adjustment rod causes movement of the cutting tool along an angled surface of the wedge between a non-cutting position and a cutting position. The method further includes coupling a second end of the adjustment rod to a rotation device configured to cause rotation of the adjustment rod and moving the rifling tool linearly through a gun barrel to form the rifled gun barrel. The cutting tool is disposed in the cutting position for movement of the rifling tool through the gun barrel in a first direction, while the cutting tool is disposed in the non-cutting position for movement of the rifling tool through the gun barrel in a second direction.

In accordance with another aspect of the invention, the method also includes disposing the gun barrel in a chuck arrangement. The chuck arrangement is configured to rotate the gun barrel during movement of the rifling tool through the gun barrel.

In accordance with yet another aspect of the invention, the rifling tool is coupled to a tool track configured to cause movement of the rifling tool in the first and second directions. In addition, movement of the rifling tool through the gun barrel in the second direction is performed at a higher speed than movement of the rifling tool through the gun barrel in the first direction.

These and other aspects and objects of the present invention will be better appreciated and understood when considered in conjunction with the following description and the accompanying drawings. It should be understood, however, that the following description, while indicating preferred embodiments of the present invention, is given by way of illustration and not of limitation. Many changes and modifications may be made within the scope of the present invention without departing from the spirit thereof, and the invention includes all such modifications. Further, although many methods and materials similar or equivalent to those described herein may be used in the practice of the present invention, a few such suitable methods and materials are described in greater detail below.

BRIEF DESCRIPTION OF THE DRAWINGS

A clear conception of the advantages and features constituting the present invention, and of the construction and operation of typical mechanisms provided with the present invention, will become more readily apparent by referring to the exemplary, and therefore non-limiting, embodiments illustrated in the drawings accompanying and forming a part of this specification, wherein like reference numerals designate the same elements in the several views, and in which.

In describing the preferred embodiment of the invention which is illustrated in the drawings, specific terminology will be resorted to for the sake of clarity. However, it is not intended that the invention be limited to the specific terms so selected and it is to be understood that each specific term includes all technical equivalents which operate in a similar manner to accomplish a similar purpose.

DETAILED DESCRIPTION OF THE DRAWINGS

The present invention and the various features and advantageous details thereof are explained more fully with reference to the non-limiting embodiments described in detail in the following description.

Figure 1:
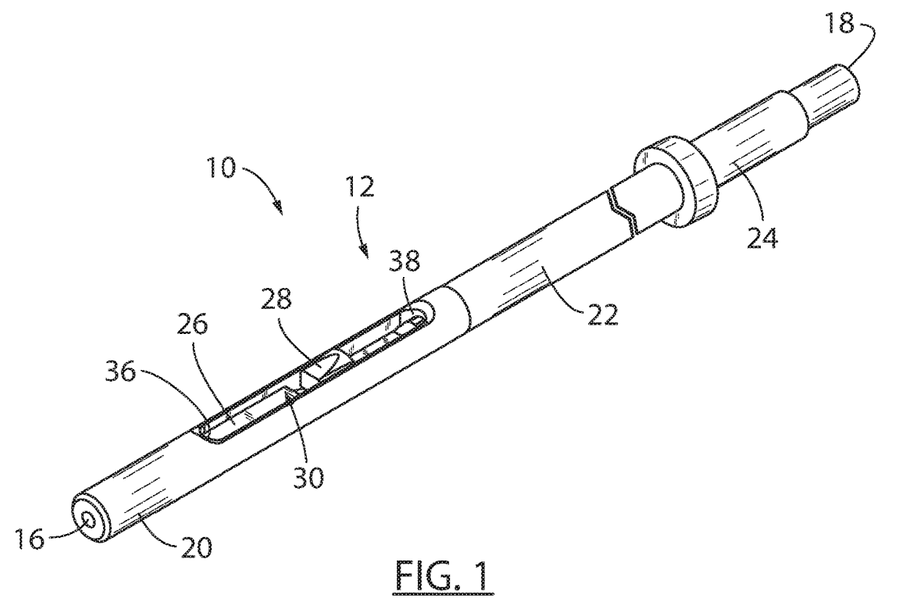
FIG. 1 is a perspective view of a single point rifling tool, according to an embodiment of the invention.
Figure 2:
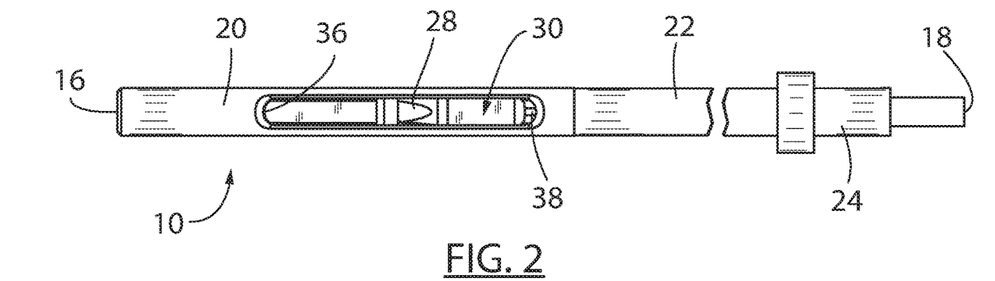
FIG. 2 is a top view of the single point rifling tool of FIG. 1.
Figure 3:
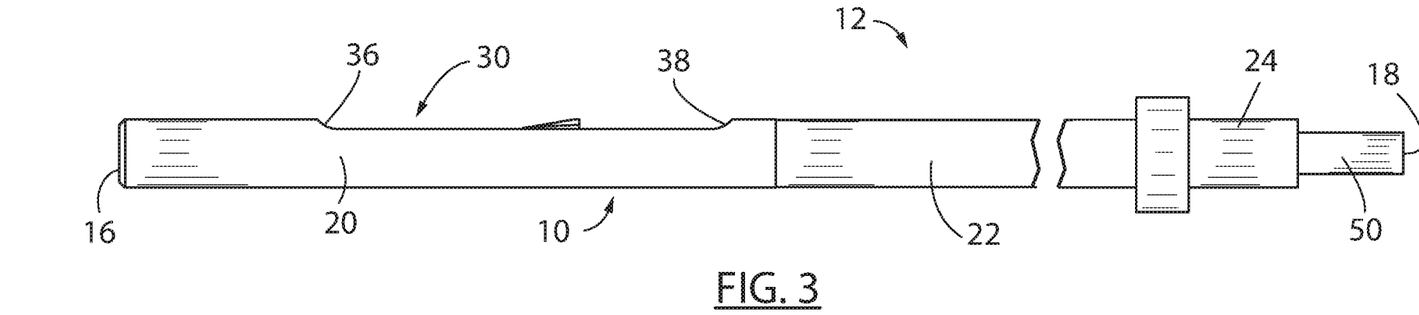
FIG. 3 is a side view of the single point rifling tool of FIG. 1, with a hook tool in a recessed position.
Figure 4:
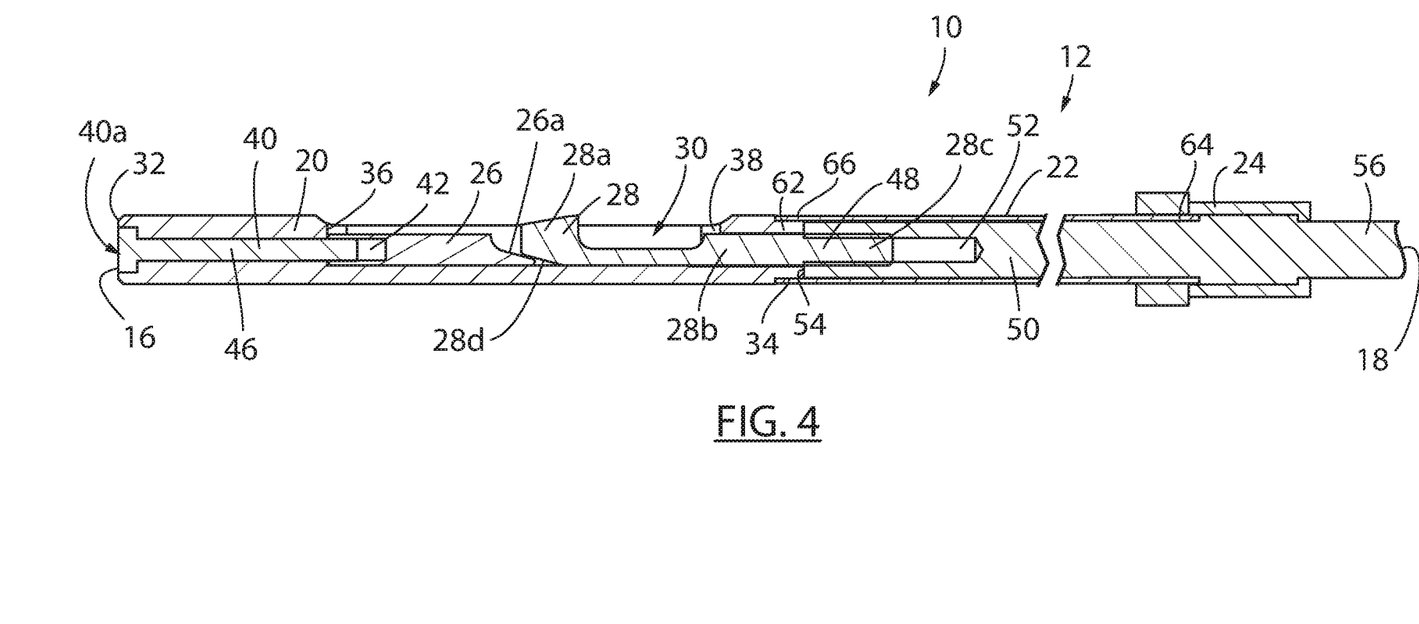
FIG. 4 is a cross-sectional view of the single point rifling tool of FIG. 1, with the hook tool in the recessed position.
Figure 5:
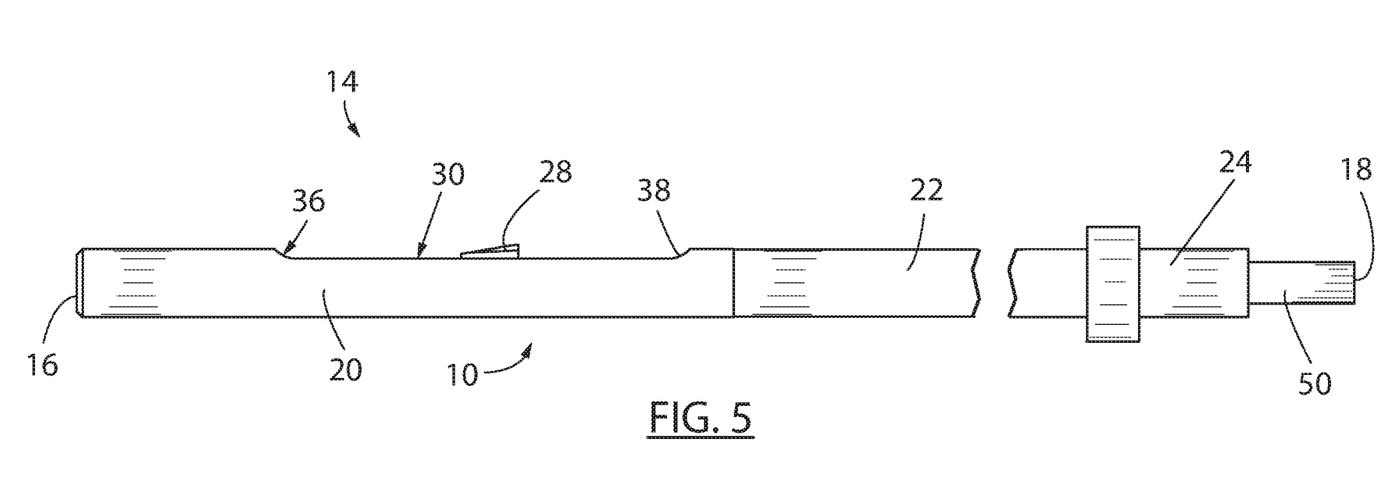
FIG. 5 is a side view of the single point rifling tool of FIG. 1, with the hook tool in a cutting position.
Figure 6:
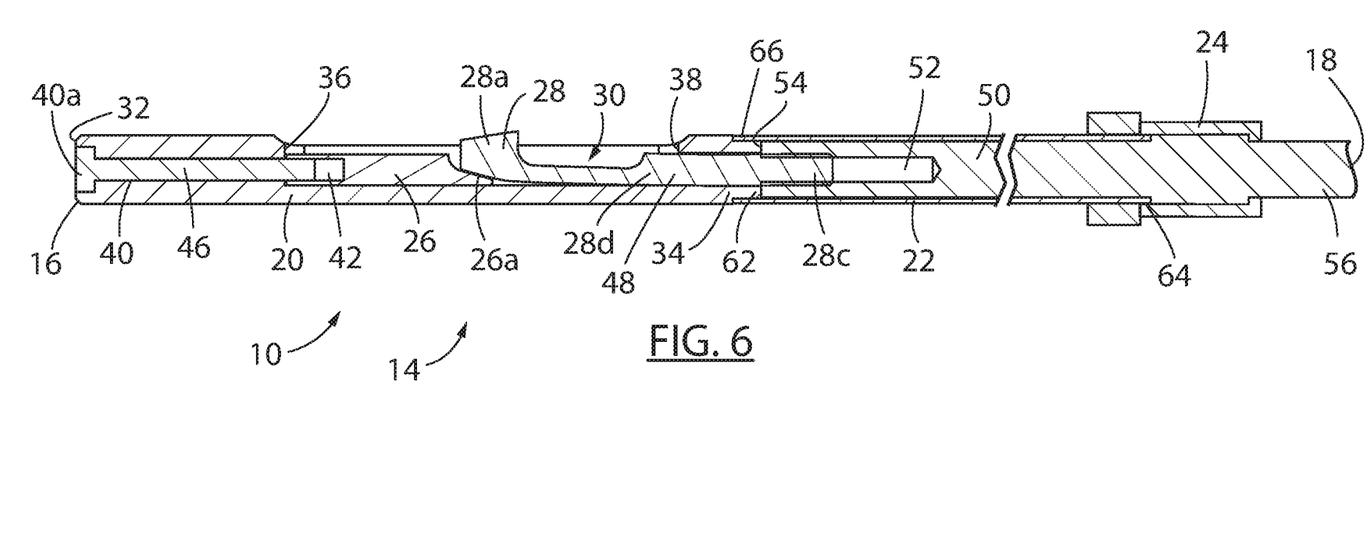
FIG. 6 is a cross-sectional view of the single point rifling tool of FIG. 1, with the hook tool in the cutting position.
Figure 7:
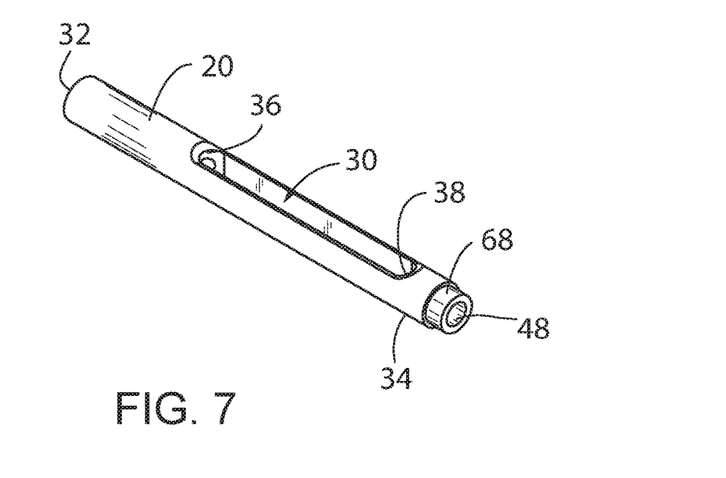
FIG. 7 is a perspective view of a rifling head of the singe point rifling tool of FIG. 1.
Figure 8:
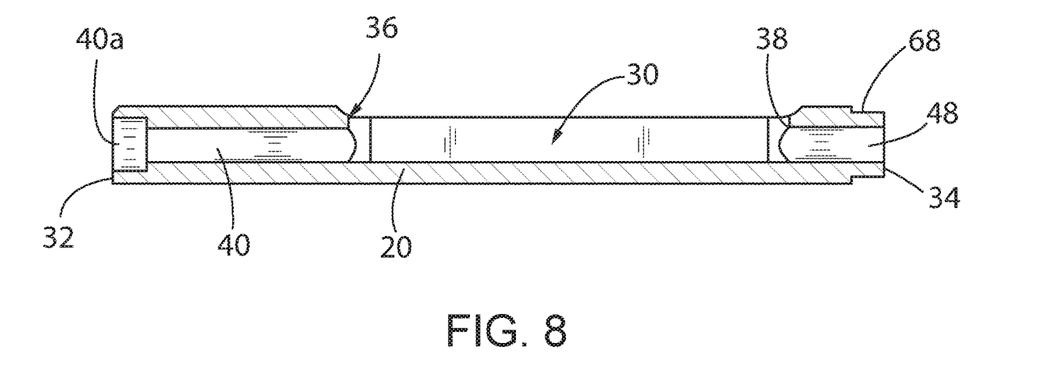
FIG. 8 is a cross-sectional view of the rifling head of FIG. 7.

First referring to FIGS. 1-6, perspective, top, side, and cross-sectional views of a single point rifling tool 10 are shown. For instance, FIGS. 3-4 illustrate the rifling tool 10 in a retracted, non-cutting position 12, while FIGS. 5-6 illustrate the rifling tool 10 in a cutting position 14. As shown in the perspective and top views of FIGS. 1-2, the rifling tool 10 has a first end 16 and a second end 18. A rifling head 20 is disposed at the first end 16 of the rifling tool 10, while a pull tube 22 and a bushing 24 are disposed at the second end 18 of the rifling tool 10.

The cross-sectional views of FIGS. 4 and 6 depict the additional elements of the rifling tool 10 that are disposed within the rifling head 20 and the pull tube 22. For example, the rifling tool 10 includes a hook ramp or wedge 26 and a cutting tool 28, such as a hook tool, disposed within the rifling head 20. In the representative embodiment of the invention, the hook ramp 26 and the hook tool 28 are disposed within a lateral opening 30 in the rifling head 20, which is disposed between a first end 32 and a second end 34 of the rifling head 20. The hook ramp 26 is disposed within the lateral opening 30 at a first end 36 of the lateral opening 30, while the hook tool 28 is disposed within the lateral opening 30 at a second end 38 of the lateral opening 30.

A channel 40 is formed in the first end 32 of the rifling head 20 and extends to the lateral opening 30. An indentation 42 may also be formed in a first end 44 of the hook ramp 26. In the representative embodiment of the invention, the channel 40 and the indentation 42 are sized to have a similar or the same diameter. A fastener 46 may be disposed within the channel 40 and into the indentation 42 in order to stationarily and statically secure the hook ramp 26 within the lateral opening 30. For example, the fastener 46 may be a screw threadably engaged with the indentation 42 of the hook ramp 26 and/or channel 40 of the rifling head 20. As shown in FIGS. 4 and 6, the channel 40 may include a countersink portion 40a disposed at the first end 32 of the rifling head 20, so that the screw 46 may be flush or spaced inward from the first end 32 of the rifling head 20.

Similarly, another channel 48 is formed in the second end 34 of the rifling head 20 and extends to the lateral opening 30. The channel 48 is sized so that the hook tool 28 may extend from the lateral opening 30 and through the channel 48. As shown in FIGS. 4 and 6, the hook tool 28 includes a cutting portion 28a disposed adjacent the hook ramp 26, a main portion 28b extending through the channel 48, and a threaded portion 28c extending out the channel 48 and into an adjustment rod 50 disposed within the pull tube 22.

The adjustment rod 50 includes a channel 52 formed in a first end 54 of the adjustment rod 50. The channel 52 is configured to receive the threaded portion 28c of the hook tool 28. In the representative embodiment of the invention, the channel 52 is also threaded so as to be threadably engaged with the threaded portion 28c of the hook tool 28. The adjustment rod 50 is able to freely rotate within the pull tube 22. Further, as the adjustment rod 50 rotates, the threaded engagement of the channel 52 of the adjustment rod and the threaded portion 28c of the hook tool 28 causes the hook tool 28 to move longitudinally within the rifling head 20. For example, a clockwise rotation of the adjustment rod 50 causes the hook tool 28 to move toward the first end 32 of the rifling head 20, while counterclockwise rotation of the adjustment rod 50 causes the hook tool 28 to move away from the first end 32 of the rifling head 20, or vice versa.

In the representative embodiment of the invention, a bottom surface 28d of the cutting portion 28a of the hook tool 28 is in contact with and rests upon an angled surface 26a of the hook ramp 26. As a result, when the hook tool 28 moves longitudinally toward the first end 32 of the rifling head 20, the bottom surface 28d of the cutting portion 28a of the hook tool 28 moves along and ascends the angled portion 26a of the hook ramp 26 so that the cutting portion 28a of the hook tool 28 is raised to increase the cutting depth of the rifling tool 10. Conversely, when the hook tool 28 moves longitudinally away from the first end 32 of the rifling head 20, the bottom surface 28d of the cutting portion 28a of the hook tool 28 moves along and descends the angled portion 26a of the hook ramp 26 so that the cutting portion 28a of the hook tool 28 is lowered to decrease the cutting depth of the rifling tool 10.

Figure 11:
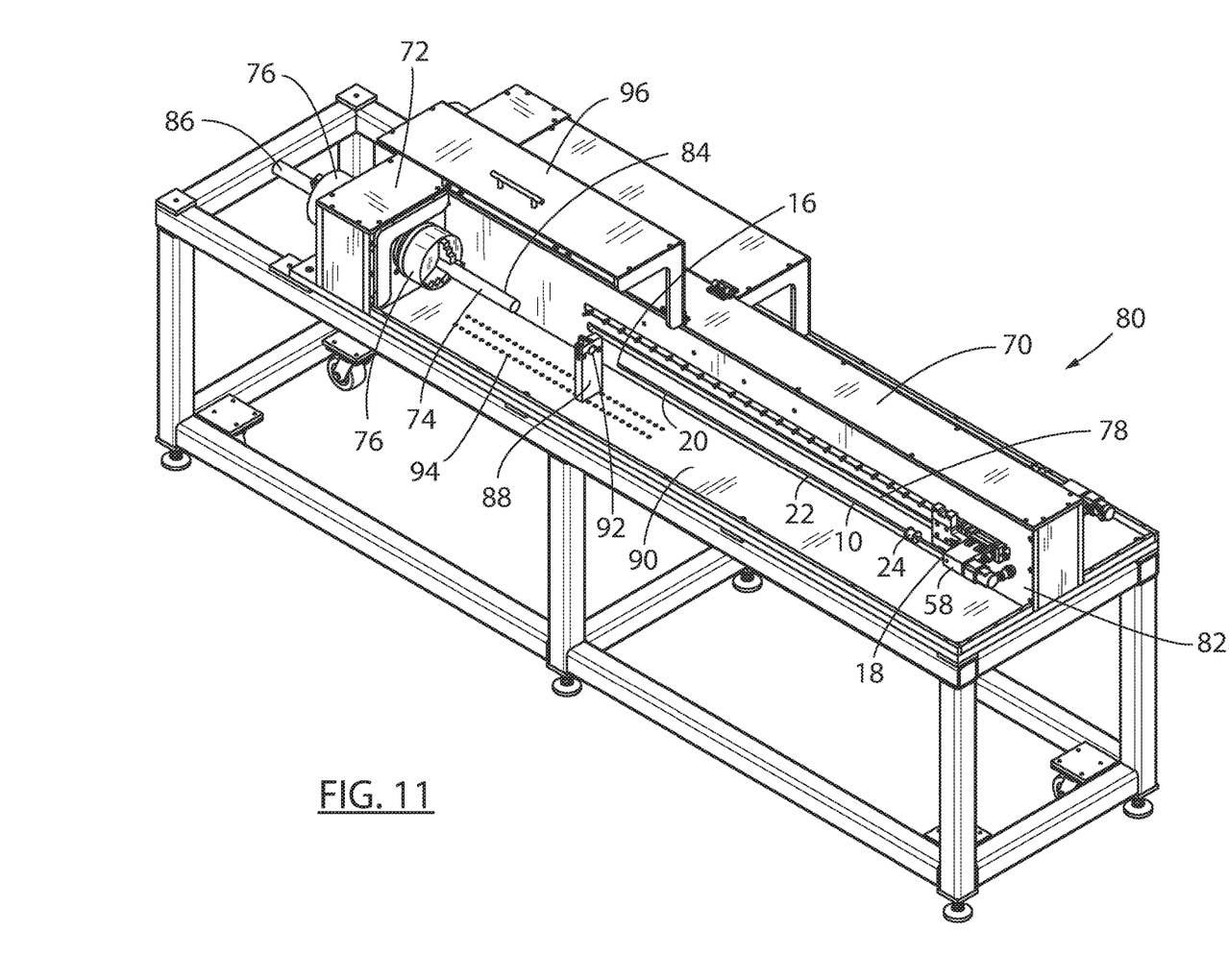
FIG. 11 is a perspective view of a rifling machine utilizing the single point rifling tool of FIG. 1.

As shown in FIG. 11, a second end 56 of the adjustment rod 50 is coupled to a rotation device 58, such as a servo motor. In turn, the servo motor 58 controls the rotation of the adjustment rod 50. As a result, a controller may be electrically coupled with the servo motor 58 to control the rotation of the adjustment rod 50 and the depth adjustment of the hook tool 28 during the rifling of a barrel.

FIGS. 1-6 further illustrate the bushing 24 disposed at a second end 64 of the pull tube 22, while a first end 66 of the pull tube 22 is coupled to the second end 34 of the rifling head 20. Meanwhile, the adjustment rod 50 extends through the bushing 24 and is able to freely rotate within the bushing 24. In the representative embodiment of the invention, the first end 66 of the pull tube 22 is permanently coupled to the second end 34 of the rifling head 20 by way of micro-welding. Meanwhile, the second end 64 of the pull tube 22 is also permanently coupled to the bushing 24 by way of micro-welding. In other embodiments of the invention, the pull tube 22 may be joined together with the rifling head 20 and the bushing 24 using alternative methods.

Referring to FIGS. 4 and 6-8, the second end 34 of the rifling head 20 is shown to include an indentation 68. The indentation 68 is configured to receive the first end 66 of the pull tube 22. That is, the outer diameter of the indentation 68 is equal to or less than the inner diameter of the pull tube 22. In turn, the pull tube 22 and rifling head 20 are permanently coupled together as described above along the overlap 62 of the second end 34 of the rifling head 20 and the first end 66 of the pull tube 22. Consequently, the rifling head 20 and the pull tube 22 are coupled together along the overlap 62 of the first end 66 of the pull tube 22 and the indentation 68 at the second end 34 of the rifling head 20.

Figure 9:
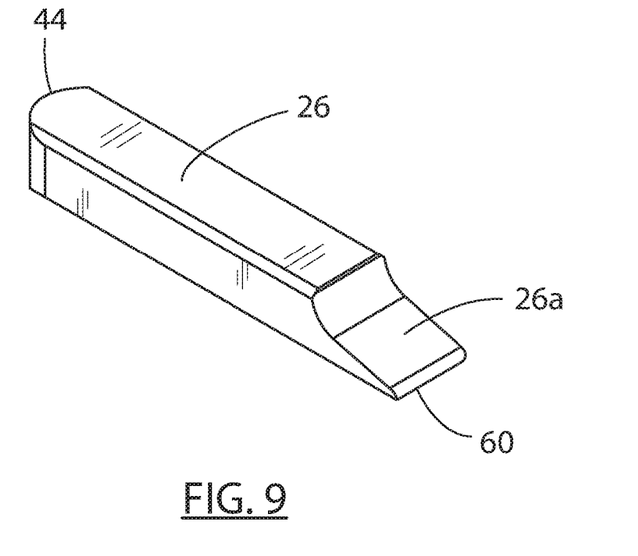
FIG. 9 is a perspective view of a hook ramp of the single point rifling tool of FIG. 1.
Figure 10:
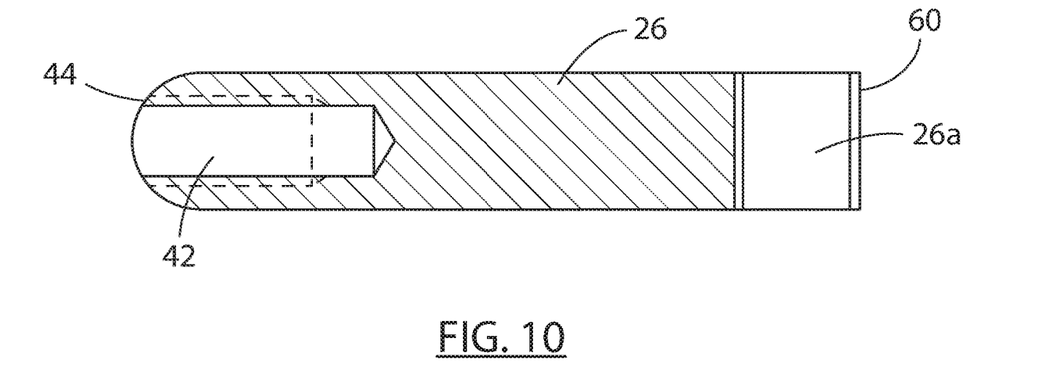
FIG. 10 is a cross-sectional view of the hook ramp of FIG. 9.

FIGS. 9 and 10 further depict the hook ramp 26 of the rifling tool 10. As previously discussed, the hook ramp 26 includes a channel 42 formed in the first end 44 of the hook ramp 26 and the angled surface 26a formed at a second end 60 of the hook ramp 26. The channel is configured to receive the fastener 46 in order to secure the hook ramp 26 within the rifling head 20. More specifically, the hook ramp 26 is secured in a stationary position at the first end 36 of the lateral opening 30 of the rifling head 20. As a result, the hook tool 28 is able to move up and down the angled surface 26a of the hook ramp 26 as the hook tool 28 is moved within the lateral opening 30 of the rifling head 20 by way of the adjustment rod 50 and servo motor 58.

Next, FIG. 11 illustrates a rifling machine 70 including the previously discussed rifling tool 10. At a first end 72 of the machine 70, a barrel 74 is disposed within a rotating chuck arrangement 76. Once secured within the chuck arrangement 76, the barrel 74 is able to be rotated at variable speed while the rifling tool 10 is moved through the barrel 74. The benefits of this will be described in further detail below. Further, the second end 18 of the rifling tool 10 is disposed within the servo motor 58, which is supported on a tool track 78.

In the neutral position shown in FIG. 11, the servo motor 58 and second end 18 of the rifling tool 10 are disposed adjacent a second end 82 of the machine 70. The tool track 78 extends from adjacent the second end 82 of the machine 70 to a location displaced from the first end 72 of the machine and the chuck arrangement 76. During the push stroke, the servo motor 58 and rifling tool 10 are moved along the tool track 78 from the neutral position toward the barrel 74 and chuck arrangement 76. As the rifling tool 10 passes through the barrel 74 on the push stroke, the hook tool 28 is moved from through the barrel 74 from a first end 84 of the barrel 74 and past a second end 86 of the barrel 74. During the push stroke, the hook tool 28 is in the retracted position 12 so as not to make contact with the barrel 74.

Once the rifling tool 10 has moved to a position where the hook tool 28 has passed completely through the barrel 74, the rifling tool 10 stops moving, and the servo motor 58 is activated to move the hook tool 28 to the cutting position 14. The rifling tool 10 is then pulled back through the barrel 74 along the tool track 78 while the chuck arrangement 76 rotates the barrel 74 for rifling the interior surface of the barrel 74. As such, the hook tool 28 is in the cutting position 28 during the pull stroke, when the hook tool 28 is moved from the second end 86 of the barrel 74 to the first end 84 of the barrel 74.

Once the rifling tool 10 has moved to a position where the rifling tool 10 and its hook tool 28 have been removed from the first end 84 of the barrel 74, the servo motor 58 is activated to move the hook tool 28 back to the retracted position 12 so that the hook tool 28 does not make contact with the interior surface of the barrel 74 during the return push stroke. By returning the hook tool 28 to the retracted position 12 for the push stroke, the push stroke of the rifling tool 10 is able to occur at a much higher speed (i.e., three times the speed) than the pull stroke. As a result, manufacturing time of the barrel 74 may be reduced. Further yet, placing the hook tool 28 in the retracted position 12 for the push stroke so that no contact is made with the interior of the barrel 74, the hook tool 28 is only worn on the pull stroke and not the push stroke. Further, the rifling grooves made in the interior of the barrel 47 are cleaner by only being cut in a single direction. For example, burring does not occur in the rifling groove due to a return cut in the opposite direction.

For each subsequent pull stroke where the hook tool 28 is in the cutting position 14, the servo motor 58 may be activated to increase the height and cutting depth of the hook tool 28. In turn, the hook tool 28 continues to cut into the interior surface of the barrel 74 and deepen the rifling groove with each subsequent pull stroke.

As such a rifled gun barrel is formed by securing a barrel 74 in the chuck arrangement 76 and moving the rifling tool 10 through the barrel 74 in a first direction, pull stroke and a second direction, push stroke. During the movement of the rifling tool 10, the chuck arrangement 76 is configured to rotate the barrel 74. As stated above, the cutting tool 28 is in the cutting position 14, which may be set at any cutting depth and is adjusted during manufacturing of the barrel 74, during the pull stroke causing movement of the rifling tool 10 in the first direction through the barrel 74. In turn, the cutting tool 28 creates a groove in the barrel 74 to form the rifling. Meanwhile, the cutting tool 28 is in the retracted, non-cutting position 12 during the push stroke causing movement of the rifling tool 10 in the second direction through the barrel 74. In turn, the cutting tool 28 makes no contact with the interior of the barrel and may be pulled in the second direction at a higher speed than in the first direction. Upon completion of the push stroke, the controller rotates the chuck arrangement 76 to ensure that the cutting tool 28 is aligned with the groove for the subsequent pull stroke. Each subsequent pull stroke in the first direction creates a deeper groove until the formation of the groove is complete. This process may be repeated for any number of grooves to form the rifling pattern. As previously stated, this results in the grooves only being cut in a single direction, which reduces wear on the cutting tool 28 and a cleaner rifling finish as there is no burring in the groove. Further yet, the increased speed of the push stroke in the second direction allows for reduction in the time for manufacturing the finished rifled barrel.

As previously mentioned, the chuck arrangement 76 is configured to rotate at a variable speed. For instance, the controller can rotate the chuck arrangement 76 at any twist rate compared to the movement speed of the rifling tool 10 through the barrel 74. As a result, the chuck arrangement 76 and rifling tool 10 can be used to form any desired rifling pattern within the barrel 74. In a non-limiting example, the chuck arrangement 76 can be programmed to make one full rotation for every eight inches of movement of the rifling tool 10 through the barrel 74. Further yet, the rotation speed of the chuck arrangement 76 can be adjusted during the pull stroke so that the rifling pattern of the barrel 74 adjusts from the second end 86 of the barrel 74 to the first end of the barrel 74. This results in a variable twist rifling that allows a bullet with a higher powder charge to seat within the barrel and build the spin rate of the bullet to optimize spin rate and velocity of the bullet. It is also contemplated that the speed of the pull stroke may also be adjusted.

The representative embodiment of the invention further illustrates a support bar 88 coupled to a work surface 90 of the rifling machine 80. The support bar 88 extends vertically from the work surface 90 of the rifling machine 80 and includes an orifice 92 formed therein to align with an axis of the rifling tool 10. The orifice 92 of the support bar 88 provides guidance for the rifling tool 10 as it extends through the orifice 92 of the support bar 88 during the above description push and pull strokes the rifling tool 10. FIG. 11 further illustrates a number of mounting holes 94 formed in the work table 90. These mounting holes 94 provide variable mounting positions for the support bar 88 so that the rifling machine 80 can accommodate any length of barrel 74. The rifling machine 80 may also include a door 96 to enclose the first end 84 of the barrel 74 and rifling tool 10 at the point of initial contact with the barrel 74.

It is specifically intended that the present invention not be limited to the embodiments and illustrations contained herein, but includes modified forms of those embodiments including portions of the embodiments and combinations of elements of different embodiments as come within the scope of the following claims.

What is claimed is:

1. A single-point rifling tool comprising:
   a rifling head with a lateral opening;
   a stationary hook ramp stationarily secured relative to the rifling tool at a first end of the lateral opening; and
   a cutting tool movably secured at a second end of the lateral opening;
   wherein the cutting tool is movable along an angled surface of the hook ramp between a retracted position and a cutting position.

2. The single-point rifling tool of claim 1 further comprising a channel formed in a first end of the rifling head and extending into the lateral opening, the channel configured to receive a fastener; and
   wherein the fastener stationarily secures the hook ramp.

3. The single-point rifling tool of claim 1 further comprising a pull tube having a first end and a second end;
   wherein the first end of the pull tube is coupled to a second end of the rifling head; and
   wherein the second end of the pull tube is coupled to a bushing.

4. The single-point rifling tool of claim 3 further comprising an adjustment rod disposed within the pull tube;
   wherein a threaded portion of the cutting tool extends into a channel formed in a first end of the adjustment rod and is threadably engaged with the channel of the adjustment rod; and
   wherein rotation of the adjustment rod causes movement of the cutting tool between the retracting position and the cutting position.

5. The single-point rifling tool of claim 4 wherein a second end of the adjustment rod is coupled to a rotation device that causes rotation of the adjustment rod.

6. The single-point rifling tool of claim 4 wherein the adjustment rod is able to freely rotate within the pull tube.

7. The single-point rifling tool of claim 4 wherein the adjustment rod extends through the bushing and is able to freely rotate within the bushing.

8. The single-point rifling tool of claim 3 wherein the second end of the rifling head includes an indentation formed therein and configured to receive the first end of the pull tube.

9. A single-point rifling tool comprising:
   a rifling head with a lateral opening;
   a hook ramp configured to be stationarily secured at a first end of the lateral opening;
   a cutting tool configured to be movably secured at a second end of the lateral opening, wherein the cutting tool is configured to be movable along an angled surface of the hook ramp between a retracted position and a cutting position;
   an adjustment rod disposed within a pull tube;
   wherein a threaded portion of the cutting tool extends into a channel formed in a first end of the adjustment rod and is threadably engaged with the channel of the adjustment rod; and wherein rotation of the adjustment rod causes movement of the cutting tool between the retracting position and the cutting position.

10. A method of manufacturing a single-point rifling tool comprising:
   providing a rifling head with a lateral opening;
   stationarily securing a stationary hook ramp relative to the rifling tool at a first end of the lateral opening;
   securing a cutting tool at a second end of the lateral opening, wherein the cutting tool is movable; and
   moving the cutting tool along an angled surface of the hook ramp between a retracted position and a cutting position.

* * * * *